United States Patent [19]

Lippl

[11] 4,207,726
[45] Jun. 17, 1980

[54] HARVESTING IMPLEMENT

[75] Inventor: Wilhelm Lippl, Ichenhausen-Oxenbronn, Fed. Rep. of Germany

[73] Assignee: Karl Mengele & Söhne Maschinenfabrik & Eisengiesserei GmbH & Co, Günzburg, Fed. Rep. of Germany

[21] Appl. No.: 972,222

[22] Filed: Dec. 22, 1978

[30] Foreign Application Priority Data

Dec. 24, 1977 [DE] Fed. Rep. of Germany ....... 2758098

[51] Int. Cl.² ........................................... A01D 45/02
[52] U.S. Cl. ..................... 56/13.9; 56/13.4; 56/60; 56/503
[58] Field of Search .................. 56/13.3, 13.4, 13.9, 56/53, 60, 13.8, 503

[56] References Cited

U.S. PATENT DOCUMENTS

| Re. 25,991 | 3/1966 | Gorham | 56/503 |
| 2,648,942 | 8/1953 | Grant et al. | 56/14.3 |
| 3,455,094 | 7/1969 | Gorham | 56/503 |
| 3,550,361 | 12/1970 | Faxas | 56/13.7 |
| 3,583,134 | 6/1971 | Kemper et al. | 56/13.3 |
| 3,715,873 | 2/1973 | Zweegers | 56/13.4 |

*Primary Examiner*—Russell R. Kinsey
*Attorney, Agent, or Firm*—Toren, McGeady and Stanger

[57] ABSTRACT

An implement particularly for harvesting corn stalks including a pair of upright counter rotating conveying rollers which define therebetween a cutting station to which crop material is conveyed by stalk guides, with the conveying rollers having knives radially extending therefrom and blades located above the knives. A counter-knife cooperates with the knives to cut the crop material which is then engaged by the blades and propelled rearwardly to a plurality of feed rollers rotating about horizontal axes. The blades are formed with rearwardly curved leading edges and axially extending conveying members are provided on the conveying rollers above the blades. The blades and the knives are angularly arranged about the conveying rollers to be alternately passed through the cutting station during rotation of the conveying rollers.

9 Claims, 2 Drawing Figures

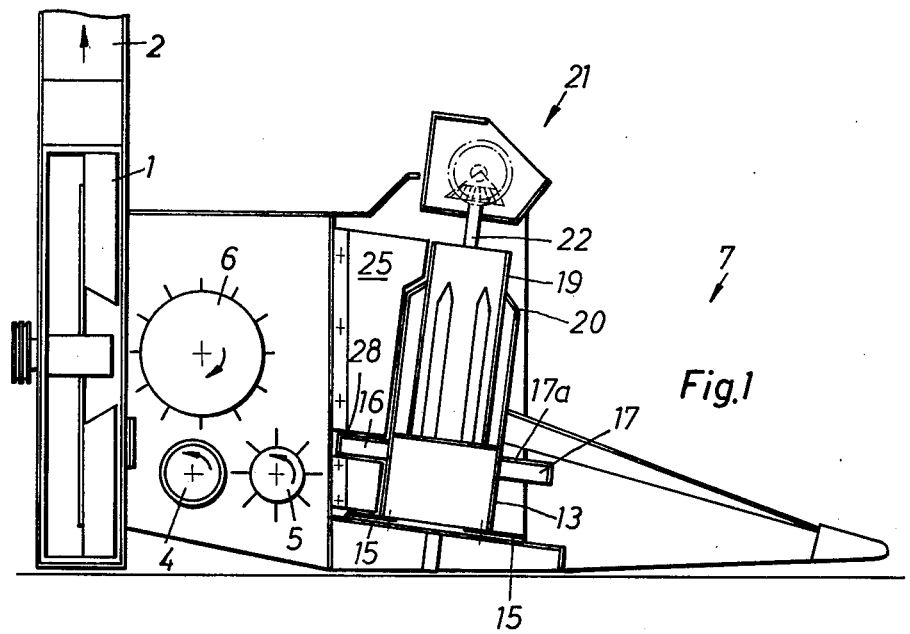
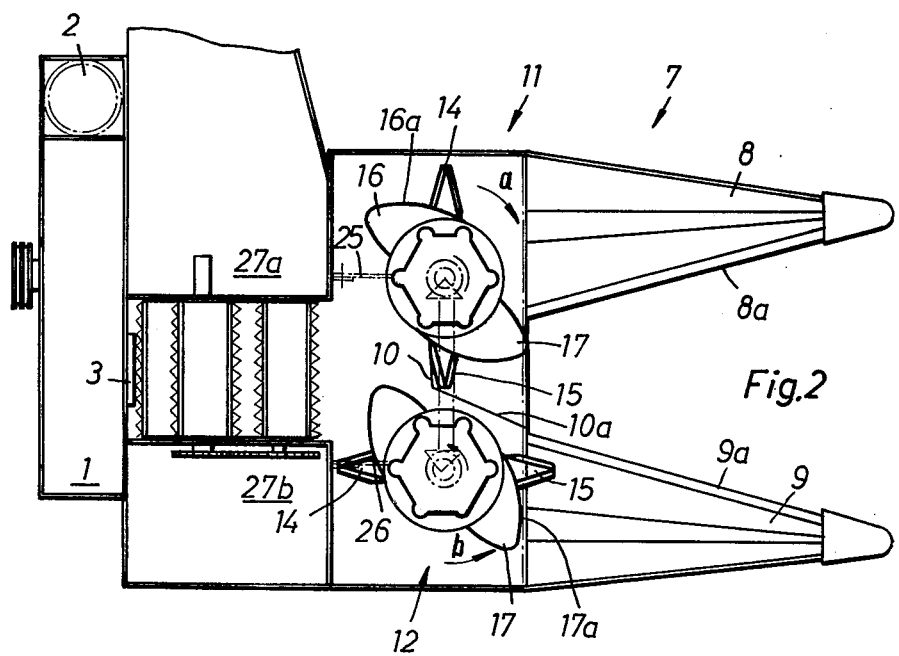

4,207,726

HARVESTING IMPLEMENT

BACKGROUND OF THE INVENTION

The present invention relates generally to harvesting implements, and particularly to a forage corn harvester for harvesting corn stalks.

In the prior art, there is known an implement for harvesting stalks of the type to which the present invention relates (see German Offenlegungsschrift No. 2,249,883) wherein conveying members consisting of two spirally shaped plates extend upwardly from knives which are arranged on the shaft of a conveyor roller in mirror-inverted fashion. Cut stalks are lifted by means of such spirally shaped plates within a cell which is formed between augers or screws arranged on opposite sides of the device. The stalks which are fed into the device are held in a strand. This hinders distribution over the entire feed slot between the feed rollers and results in a nonuniform cut. Additionally, stalks may become stuck between the spirally shaped plates and they may be bent over or torn off thereby leading to clogging of the device and damage.

Accordingly, it is the intent of the present invention to provide a conveying device in implements for harvesting stalks, particularly of the type previously mentioned, wherein the stalks will be freely guided to the feed rollers of the device on a level which may be predetermined and wherein, accordingly, the danger of clogging is essentially eliminated.

SUMMARY OF THE INVENTION

Briefly, the present invention relates to a harvesting implement wherein a pair of upright counter-rotating conveyor rollers are arranged to define therebetween a cutting station, with a pair of stalk guides including stalk dividers operating to effect conveyance of the stalks to the cutting station. The conveyor rollers rotate in basically opposed directions on upright shafts which are approximately vertical. The rollers are provided with conveying members extending axially along the upper portions thereof and knives located generally at the lower portions of the conveying rollers interact with a shear plate or counterknife to effect cutting of the corn stalks which are conveyed by means of the conveying members with those ends of the stalks having been cut pointing forwardly. The cut stalks are subsequently conveyed to feed rollers of a chopping device which are arranged for rotation about horizontal shafts.

In accordance with the invention, at least one blade member extending parallel to the knives and angularly staggered relative thereto is arranged on each of the conveyor rollers, with the blades being distributed about the circumference of the rollers such that the blade of one conveyor roller engages the blade of the other conveyor roller with periodic alteration, preferably uniformly.

As a result of this arrangement the stalks which are cut by the knives are grasped by the trailing blade which is arranged above the point where the stalks are cut and they are lifted with the points where the stalks are cut pointing forwardly into the feed slot between the gripping rollers whereby they may reach without forced guidance the feed slot of the feed rollers as a result of the forward movement of the forage harvester and the conveying action of the blades.

The blades may advantageously consist of abrasion-proof material and they may be manufactured, for example, together with the shaft of the conveying roller in a single casting.

In an advantageous embodiment of the invention, the shafts of the conveying rollers may be provided with radially projecting knives which travel above the counter-knives which are arranged to extend approximately perpendicularly to the feed direction of the stalks, with each knife being trailed by a blade of the same conveying roller. In the case of a plurality of radially extending knives and blades at each conveying roller, the knives and the blades will always be arranged with the knife and blade of one of the rollers engaging the knife and blade of the other roller.

In a further development of the invention, the knives with their cutting edges and the blades may extend approximately to the vicinity of the shaft of the oppositely located conveying roller.

An advantageous distribution of the cut material in the feed slot of the feed rollers immediately behind the cutting station may be achieved by arranging the leading edges of the blades so that they are formed with a curved configuration extending rearwardly relative to their direction of movement.

Furthermore, a wide striking surface of the blades is achieved in that the blades may be constructed with a cup shape, with the bottom of the cup shape facing upwardly. The blades may be formed of lightweight construction and the device of the invention may provide excellent operation even when only a single knife and a single blade are arranged at each conveying roller. An embodiment with two knives and two blades at each conveying roller, arranged in a crosswise manner, will also prove to be effective.

Of course, analogous combinations of the blades with any selected knife arrangement is also possible.

The conveying rollers may be formed with a lower diameter portion and a reduced upper diameter portion, with rib-like conveying means being provided at the reduced upper diameter portion. The conveying ribs may extend diametrically from the reduced upper diameter portion to coincide with the outer diameter of the lower portion of the conveying rollers.

Furthermore, the arrangement of the invention facilitates a rather simple allocation of stripper plates with optimum action between the gripping rollers and the feed rollers which are provided with at least one passage intended for the blades.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the Drawings:

FIG. 1 is a sectional side elevation of a forage corn harvester in accordance with the invention; and FIG. 2 is a top view of the harvester shown in FIG. 1 with portions thereof being omitted.

DETAILED DESCRIPTION OF THE PREFERRED EMBODIMENTS

Referring to the drawing, the forage corn harvester of the invention is shown as including a chopping or cutting device 1 which includes a disc cutter with a crop chute or discharge tube 2. Feed rollers 4, 5 and 6 disposed in front of the cutting device are adapted to convey harvested material which is delivered thereto to a chopper inlet 3, best seen in FIG. 2, where the harvested material is cut in association with a stationary member.

A single-row corn header 7 consists of a pair of stalk dividers 8 and 9 which have lateral and upper cover plates with lateral guide surfaces 8a and 9a terminating at sides 10a of a U-shaped stationary member 10. /

In association with stationary member 10 there are arranged in accordance with the invention forwardly inclined but substantially vertically disposed conveying rollers 11 and 12 including lower shaft portions 13 which mount radially extending knives 14 and 15 with each of the knives being located opposite to a knife on the opposed roller 11, 12. At the upper ends of the shaft portions 13 there are provided blades 16 and 17, with each of these blades being arranged to trail the knives at the lower end taken in the direction of rotation of the rollers 11, 12, with the directions of rotations being shown by arrows a and b. The blades 16 and 17 comprise, respectively, edges 16a and 17a which are formed with leading edges curved rearwardly taken in the direction of movement of the blades. As will be seen from the drawing, the rollers 11, 12 include shaft portions 19 which extend above the blades 16 and 17 and which are formed with diameters smaller than the diameters of the shaft portions 13, with the shaft portions 19 having formed thereon axially extending conveying members 20. The outermost diameters of the upper portions of the rollers 11, 12 including the diametrically outermost terminations of the conveying members 20 are formed to correspond in diameter to the outer diameter of the lower shaft portions 13.

The device is provided with an overhead drive 21 which operates to effect rotation of the conveying rollers 11, 12.

As will be seen from the drawing, the knives 14, 15 and the blades 16, 17 are arranged on each of the rollers 11, 12 in such a manner that the blades trail the knives in the direction of rotary motion of the rollers. The knives and the trailing blades of the conveying roller 11 are followed through a cutting station located between the rollers 11, 12 at the station member 10 by the knives and trailing blades of the other conveying roller 12. The knives and blades travel through the cutting station above the stationary member 10 and they may extend approximately up to the shaft portions 13. Stripper plates 25 and 26 extend to a housing 27 which supports the feed rollers 4–6. The stripper plates 25 and 26 have defined therein passage slots 28, best seen in FIG. 1, through which the blades 16 and 17 pass.

In the operation of the device of the invention, during travel of the forage corn harvester which is mounted on a tractor in an offset mounting arrangement, for example, by means of a transverse frame (not shown) the stalks will be guided by the guides 8a and 9a to the sides 10a of the stationary member 10 and they are cut by the knives 14 and 15 in an alternating manner at the counterknife 10. Subsequently, the stalks are lifted and conveyed by the blades 16 and 17 to and by the feed roller 5 and into the feed slot between the feed rollers 4 and 6 and into the cutting device 1.

While a specific embodiment of the invention has been shown and described in detail to illustrate the application of the inventive principles, it will be understood that the invention may be embodied otherwise without departing from such principles.

What is claimes is:

1. A harvesting implement particularly for harvesting corn stalks comprising: a pair of upright counterrotating conveying rollers defining therebetween a cutting station at which harvested material is cut by rotation of said conveying rollers; stalk guide means including stalk dividers extending forwardly of said conveying rollers to guide incoming crop material to be harvested to said cutting station between said conveying rollers; knife means extending radially from each of said conveying rollers and arranged to pass alternately through said cutting station; stationary means arranged at said cutting station for cooperative engagement with said knife means to effect cutting of said incoming crop material; a plurality of feed rollers arranged for rotation about generally horizontal axes located rearwardly of said cutting station for receiving said cut crop material therefrom; conveying members extending axially upwardly along said conveying rollers above said knife means to convey cut crop material toward said feed rollers; and blade means located on each of said conveying rollers and extending radially therefrom between said knife means and said conveying members, said blade means being angularly arranged on said conveying rollers such that the blade means on one of said conveying rollers passes through said cutting station alternately with the blade means of the other of said conveying rollers in a uniform periodic relationship.

2. An implement according to claim 1 wherein said knife means comprise a plurality of individual knives and wherein said blade means comprise a plurality of individual blades, said blades being arranged to trail said knives taken relative to the direction of rotation of said conveying rollers.

3. An implement according to claim 2 wherein said blades comprise leading edges having a curved configuration extending rearwardly of said blades taken in the direction of motion thereof.

4. An implement according to claim 1 wherein said blade means comprise blades which are constructed with a cup-shaped configuration facing upwardly of said conveying rollers.

5. An implement according to claim 1 wherein said knife means comprise two knives and wherein said blade means comprise two blades, said knives and said blades being arranged to extend in a direction intersecting each other.

6. an implement according to claim 1 wherein each of said conveying rollers comprise a reduced diameter portion extending above said blades with said conveying members being provided on said reduced diameter portion.

7. An implement according to claim 6 wherein said conveying rollers comprise a lower shaft portion adjacent said reduced diameter portion, said lower shaft portion having an outer diameter which is equivalent to the outer diameter of said upper shaft portion including said conveying members.

8. An implement according to claim 1 wherein there are provided stripper plates extending rearwardly of said cutting station, said stripper plates having formed therein passage slots provided between said conveying rollers and said feed rollers through which said blade means may pass.

9. An implement according to claim 1 wherein said blade means and said knife means of each conveying roller extend radially outwardly therefrom to a point proximate the outer diameter of the other conveying roller.

* * * * *